United States Patent [19]

Gorzegno et al.

[11] Patent Number: 4,694,758
[45] Date of Patent: Sep. 22, 1987

[54] SEGMENTED FLUIDIZED BED COMBUSTION METHOD

[75] Inventors: Walter P. Gorzegno, Morristown; Iqbal F. Abdulally, Randolph, both of N.J.

[73] Assignee: Foster Wheeler Energy Corporation, Livingston, N.J.

[21] Appl. No.: 942,126

[22] Filed: Dec. 16, 1986

[51] Int. Cl.⁴ .............................................. F23D 1/00
[52] U.S. Cl. .................................... 110/347; 110/245; 122/4 D; 431/7
[58] Field of Search ....................... 110/245, 347, 341; 122/4 D; 431/7, 170

[56] References Cited

U.S. PATENT DOCUMENTS

| | | | |
|---|---|---|---|
| 3,893,426 | 7/1975 | Bryers | 122/4 D |
| 3,921,590 | 11/1975 | Mitchell et al. | 122/4 D |
| 4,184,455 | 1/1980 | Talmud et al. | 122/4 D |
| 4,240,364 | 12/1980 | Bryers et al. | 110/347 |
| 4,279,222 | 7/1981 | Pearce | 122/4 D |
| 4,436,507 | 3/1984 | Stewart et al. | 122/4 D X |
| 4,469,050 | 9/1984 | Korenberg | 122/4 D X |
| 4,594,967 | 6/1986 | Wolowodiuk | 122/4 D |

*Primary Examiner*—Edward G. Favors
*Attorney, Agent, or Firm*—Marvin A. Naigur; Warren B. Kice

[57] ABSTRACT

The method of the present invention features the provision of a plurality of segmented chambers formed in an enclosure. Particulate fuel and air are introduced into one of said chambers during start-up and low loads, and, as the load increases, fuel and air are introduced to additional beds. The air velocity is controlled so that bubbling fluidized beds are initially established in the chambers and, as the load increases, the air velocity is increased to establish a circulating fluidized bed in each chamber.

4 Claims, 9 Drawing Figures

SEGMENTED FLUIDIZED BED COMBUSTION METHOD

BACKGROUND OF THE INVENTION

This invention relates to a method of fluidized bed combustion in which heat is generated by the combustion of fuel in a plurality of segmented fluidized beds.

Combustion systems utilizing fluidized beds as the primary source of heat generation are well known. In these arrangements, air is passed through a bed of particulate material, including a fossil fuel such as coal and an adsorbent for the sulfur generated as a result of combustion of the coal, to fluidize the bed and to promote the combustion of the fuel at a relatively low temperatures. When the combustor is utilized as a steam generator, the heat produced by the fluidized bed is utilized to convert water to steam which results in an attractive combination of high heat release, high sulfur absorption, low nitrogen oxides emissions and fuel flexibility.

The most typical fluidized bed combustion system is commonly referred to as a "bubbling" fluidized bed in which a bed of particulate materials is supported by an air distribution plate, to which combustion-supporting air is introduced through a plurality of perforations in the plate, causing the material to expand and take on a suspended, or fluidized, state. The gas velocity is typically two to three times that needed to develop a pressure drop which will support the bed weight (e.g., minimum fluidization velocity), causing the formation of bubbles that rise up through the bed and give it the appearance of a boiling liquid. The bed exhibits a well-defined upper surface, and the entrainment of particles in the gas leaving the bed is quite low, such that collection and recycle of these particles is not always necessary. The heat and mass transfer properties of the two-phase mixture are high, being typical of a liquid.

In a steam generator environment, the walls enclosing the bubbling bed are formed by a plurality of heat transfer tubes, and the heat produced by combustion within the fluidized bed is transferred to water circulating through the tubes. The heat transfer tubes are usually connected to a natural water circulation circuitry, including a steam drum, for separating water from the steam thus formed which is routed to a turbine or to another steam user.

In an effort to extend the improvements in combustion efficiency, pollutant emissions control, and operation turn-down afforded by the bubbling bed, a fluidized bed reactor has been developed utilizing a "circulating" fluidized bed. In these arrangements the mean gas velocity is increased above that for the bubbling bed, so that the bed surface becomes more diffused and the solids entrainment from the bed is increased. According to this process, fluidized bed densities between 5 and 20% volume of solids are attained which is well below the 30% volume of solids typical of the bubbling fluidized bed. The formation of the low density circulating fluidized bed is due to its small particle size and to a high solids throughput, which require high solids recycle. The velocity range of a circulating fluidized bed is between the solids terminal, or free fall, velocity and a velocity beyond which the bed would be converted into a pneumatic transport line.

The high solids circulation required by the circulating fluidized bed makes it insensitive to fuel heat release patterns, thus minimizing the variation of the temperature within the steam generator, and therefore decreasing the nitrogen oxides formation. Also, the high solids loading improves the efficiency of the mechanical device used to separate the gas from the solids for solids recycle. The resulting increase in sulfur adsorbent and fuel residence times reduces the adsorbent and fuel consumption.

However the circulating fluidized bed process is not without problems. For example, during start-up or at lower loads, the entire lower portion of the fluidized bed has to be utilized, notwithstanding the fact that only a portion is actually needed. This requires a relatively long time to complete start-up and, in addition, requires relatively large capacity start-up burners, and relatively large amounts of fluidizing combustion air to maintain an adequate fluidizing velocity. Further, when using the entire lower portion of the bed during start-up and low loads, the temperature of the bed can fall below a value required for stable ignition and it is difficult to achieve relatively quick starts and desired turndown ratios.

SUMMARY OF THE INVENTION

It is therefore an object of the present invention to provide a fluidized bed combustion method in which a circulating fluidized bed is used in which a relatively low amount of fluidizing/combustion air can be used during start-up and low loads.

It is a still further object of the present invention to provide a method of the above type in which the temperature of the bed is maintained at sufficient levels to insure stable ignition at start-up and low loads.

It is a still further object of the present invention to provide a method of the above type in which start-up can be completed in a relatively short time and in which adequate turn-down ratios can be achieved.

It is a still further object of the present invention to provide a method of the above type in which the lower portion of the fluidized bed is segmented with the segments being used selectively during start-up and low loads.

Towards the fulfillment of these and other objects the method of the present invention features the provision of a plurality of segmented chambers formed in an enclosure. Particulate fuel and air are introduced into one of said chambers during start-up and low loads and, as the load increases, fuel and air are introduced to additional chambers. The air velocity is controlled so that bubbling fluidized beds are initially established in the chambers and, as the load increases, the air velocity is increased to establish circulating fluidized beds in each chamber.

BRIEF DESCRIPTION OF THE DRAWINGS

The above brief description as well as further objects, features and advantages of the method of the present invention will be more fully appreciated by reference to the following detailed description of presently preferred but nonetheless illustrative embodiments in accordance with the present invention when taken in conjunction with the accompanying drawing in which.

DESCRIPTION OF THE PREFERRED EMBODIMENT

Figure 1:
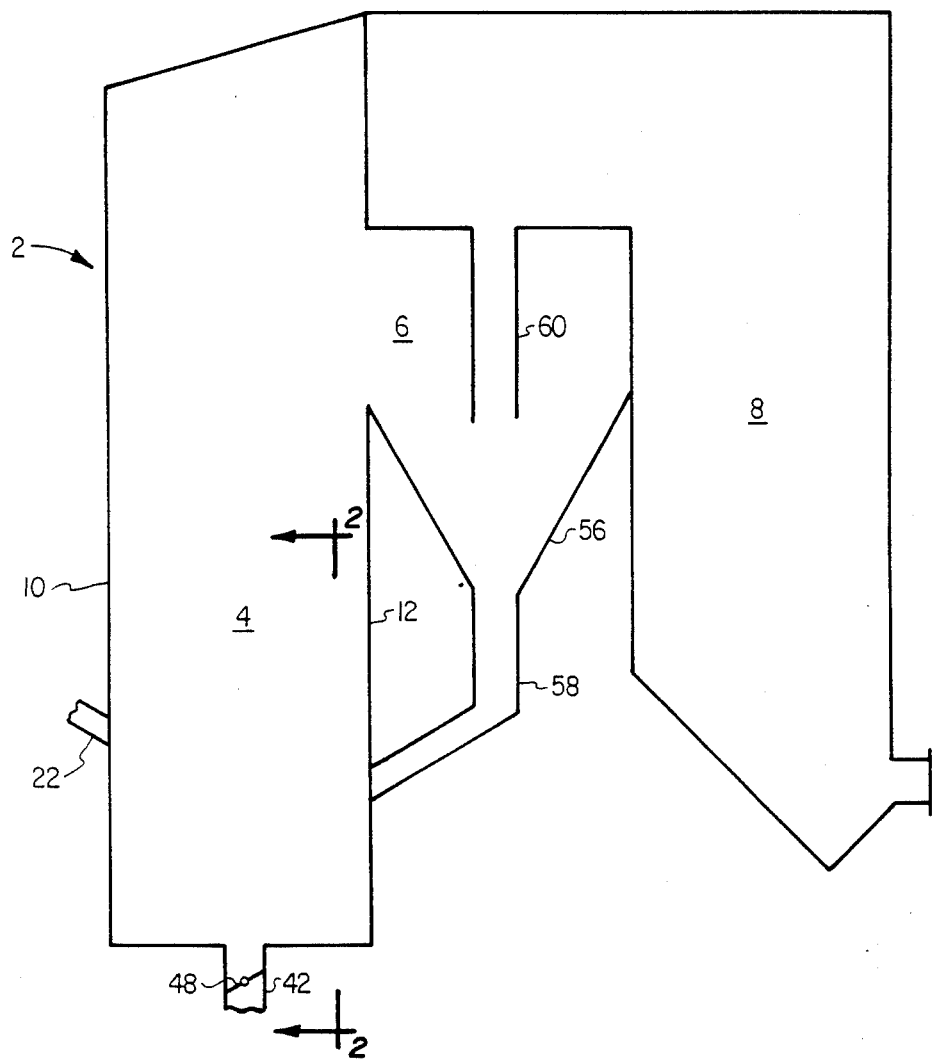
FIG. 1 is a schematic view of a combustion system employing features of the present invention.
Figure 2:
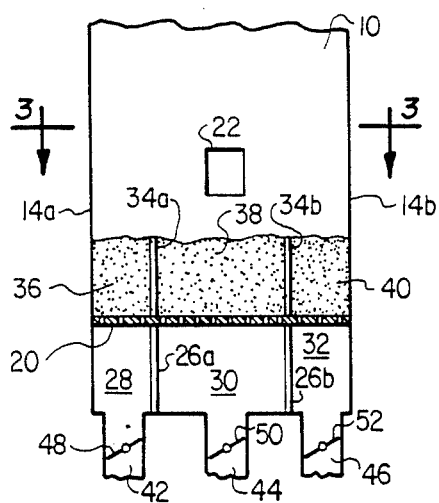
FIG. 2 is a cross-sectional view taken along the line 2—2 of FIG. 1.

Referring to FIGS. 1 and 2 of drawings, the reference numeral 2 refers in general to the combustion system of the present invention which includes a furnace section 4, a separating section 6 and a heat recovery section 8. The furnace section 4 consists of a front wall 10, a rear wall 12 and two side walls 14a and 14b (FIG. 2). An opening 16 is provided in the wall 12 for permitting gases to pass from the furnace section 4 to the separating section 6, as will be explained.

It is understood that if the combustor of the present invention is used for the purpose of steam generation, the walls 10, 12, 14a, and 14b would be formed by a plurality of heat exchange tubes formed in a parallel airtight manner to carry the fluid to be heated, such as water. Additional tubes can also be provided to route the water through the interior of the boiler in a conventional manner with these tubes being omitted in the drawing for the convenience of presentation.

A bed of particulate material, shown in general by the reference numeral 18, is disposed within the furnace section 4 and rests on a perforated grate 20 extending horizontally in the lower portion of the boiler. The bed 18 can consist of discrete particles of fuel material such as bituminous coal which are introduced into the furnace section 4 via an inlet feeder 22. It is understood that a sulfur adsorbent material, such as limestone, can be introduced into the furnace section 4 in a similar manner via another feeder (not shown) for adsorbing the sulfur generated by the burning coal, in a conventional manner.

An air plenum 24 is provided immediately below the grate 20 and is connected to an external air source (not shown). A pair of partitions 26a and 26b of a refractory material, are disposed in the plenum 24 and divide it into three compartments 28, 30, and 32. Similarly, a pair of partitions 34a and 34b extend upwardly from the grate 24 in line with the partitions 26c and 26b, respectively and define three upper compartments 36, 38 and 40.

The chambers 28, 30 and 32 are provided with inlets 42, 44 and 46, respectively which, in turn, are provided with dampers 48, 50 and 52, respectively. The dampers 48, 50 and 52 are mounted in their respective inlets 42, 44 and 46 for pivotal movement about their centers in response to actuation of external controls (not shown) to vary the effective openings in the inlets and thus control the flow of air through the inlets, the chambers 28, 30 and 32, the grate 20 and the chambers 36, 38 and 40. Since the dampers 26a and 26b are of a conventional design they will not be described in any further detail.

It is understood that a bed light-off burner (not shown) is mounted through the front wall 10 immediately above the grate 20 for initially lighting off a portion of the bed 18 during start-up.

The air, after passing upwardly through the chambers 28, 30 and 32, the grate 20, and the chambers 36, 38 and 40 combine with the products of combustion from the burning coal in the bed 18 and the resulting mixture entrains a portion of the fine coal particles in the furnace section 4 before passing, via the opening 16, into the separating section 6 as shown by the flow arrows. The separating section 6 includes a cyclone separator 56 which operates in a conventional manner to separate the entrained solid particles from the mixture of air and combustion gases. The solid particles fall, by gravity, into the lower portion of the separator 56 from which they pass, via a conduit 58, through an opening in the wall 12 and into the chamber 38. The gases from the cyclone separator pass, via an outlet conduit 60, into the heat recovery section 8 as also shown by the flow arrows.

To start up the system, particulate fuel material from the feeder 22 is introduced into the chamber 38 and adsorbent material can also be introduced in a similar manner, as needed. The damper 50 is opened, the dampers 48 and 52 are closed, and air from the external source passes through the inlet 44, the grate 20, and into the particulate material in the chamber 38. The air is maintained at a relatively low velocity to prevent any substantial elutriation and it is understood that a preheat burner or the like can be provided in the chamber 30 to preheat the air before it passes into the chamber 38.

A light-off burner (not shown) or the like, is disposed in the chamber 38 and is fired to ignite the particulate material in the latter chamber. When the temperature of the material in the chamber 38 reaches a higher level, additional particulate fuel from the feeder 22 is discharged onto the upper portion of the material in the chamber. The velocity of air introduced to the chamber 38 is increased until it reaches, or slightly exceeds, the minimum fluidizing velocity so that a bubbling bed is formed in the chamber i.e. the air velocity is two or three times that needed to develop a pressure drop which will support the bed weight. A demand, or load, is placed on the combustion system which, in the case of a steam generator, would be the circulation of water in a heat exchange relation to the furnace 4 to add heat to the water to generate steam, and this continues until the load reaches a predetermined level, such as approximately 25% of maximum.

The flow of particulate material from the feeder 22 to the chamber 38 is then increased until the height of the material in the chamber 38 exceeds the heights of the partitions 34a and 34b, and the material thus spills over into the chambers 36 and 40. The dampers 48 and 52 are then opened to pass air into the chambers 36 and 40 respectively, and fluidize the material in the latter chambers. The velocity of air flowing into the chambers 36 and 40 is controlled so that bubbling beds are also established in the latter chambers as described above.

It is understood that preheat burners may also be associated with the chambers 28 and 32 and light-off burners may be associated the chambers 36 and 40 as needed in order to precisely control the temperature of the material in the latter chambers.

Particulate fuel material is continuously discharged directly from the feeder 22 onto the upper portion of the chamber 38 where it spills over into the chambers 36 and 40. The material in the chamber 38 is self-combusting by the heat in the latter chamber and the material in chambers 36 and 40 will pick up heat from the material in the chamber 38 by virtue of the fact that the material circulates between the chambers 36, 38, and 40 above the partitions 34a and 34b.

The mixture of air and gaseous products of combustion passing upwardly through the beds in the chambers 36, 38, and 40 entrain, or elutriate, the relatively fine particulate material in the latter chambers and the resulting mixture passes from the upper portion of the furnace section 4 through the opening 16 and into the separating section 6. The solid particulate material is separated from the mixture of air and gaseous products of combustion in the separator 56 and the former is injected, via the conduit 58, into the chamber 40. The cleaned mixture of air and gaseous products of combustion pass into and through the outlet conduit 60 in the separator 56 and exits to the heat recovery section 8 for further treatment.

When the load demand exceeds a predetermined higher value, such as 35% of maximum load, the fluidizing velocity of the air introduced through the inlets 42, 44, and 46; the chambers 28, 30 and 32; and into the material in the chambers 36, 38, and 40 is increased in accordance with the size of the particulate material to a value above that for a bubbling bed so that the bed surface become more diffuse, the solids entrainments in each chamber increases and a circulating fluidized bed is formed in each chamber. In this state the particulate material in each bed is fluidized to an extent that substantial entrainment or elutriation of the particulate material in the beds is achieved so that the mixture of air and gaseous products of combustion passing into the upper portion of the furnace 4 is substantially saturated with the particulate material. This, of course, increases the amount of particulate material separated by the cyclone separator 56 and reintroduced into the chamber 40 via the conduit 58. During this circulating mode at relatively high load levels, the combustion of the fuel material begins in the lower furnace region where the solid particles are held in simi-suspension in an upward flowing gas stream and is completed in the free-board space above the partitions 34a and 34b.

The recycled material from the cyclone 56 entering the chamber 40 is in intimate contact with the combustible fuel material in the latter chamber and serves as a heat transfer medium between the burning fuel and the inner surfaces of the walls 10, 12, 14a, and 14b. This material makes intimate contact with the incoming fuel from the feeder 22 and quickly heats it to temperatures at which it can gasify. The solids in the gas also transfers heat to the walls 10, 12, 14a, and 14b which causes the circulating water in the walls to absorb heat from the combustion products of the fuel.

Several advantages result from the method of the present invention. For example relatively low amount of fluidizing/combustion air can be used during start-up and low loads. Also, the temperature of the bed is maintained at sufficient levels to permit a relatively quick start-up and to insure stable ignition at start-up and low loads. Further, adequate turn-down ratios can be achieved.

Figure 3:
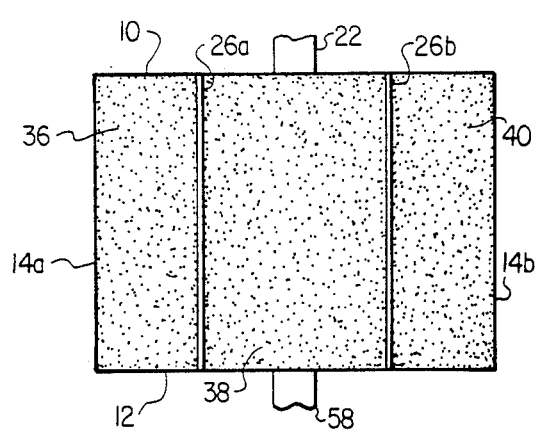
FIG. 3 is a cross-sectional view taken along the lines 3—3 of FIG. 2.

FIGS. 4–9 are views similar to that of FIG. 3 but depicting alternate arrangements of the particular bed-chamber arrangement in the furnace section 4, with identical components being given the same reference numerals.

Figure 4:
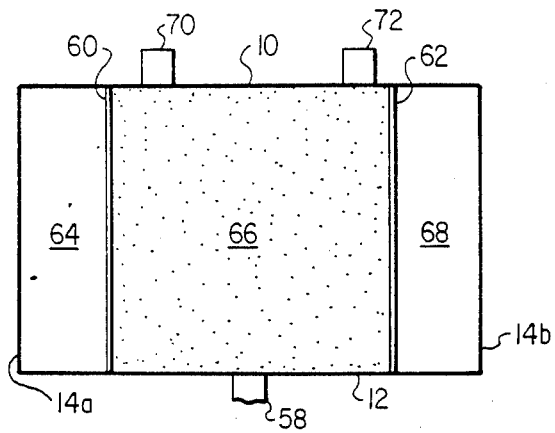
FIGS. 4-9 are views similar to FIG. 3 but depicting alternate embodiments of the combustion system of the present invention.

According to the embodiment of FIG. 4, partitions 60 and 62 are provided which extend upwardly from the grate, and which divide the furnace section 4 into three chambers 64, 66, and 68. It is understood that the partitions 60 and 62 are aligned with partitions extending below the grate 20 in the air plenum 24 in a manner similar to the partitions 26a and 26b of the embodiment of FIGS. 1–3. The chamber 66 has a greater width, or depth, than the chambers 64 and 68 and two feeders 70 and 72 are provided which extend through the sidewall 14a for discharging particulate fuel material onto the upper surface of the material in the chamber 66. The operation is otherwise the same as described above in connection with the embodiment of FIGS. 1–3.

Figure 5:
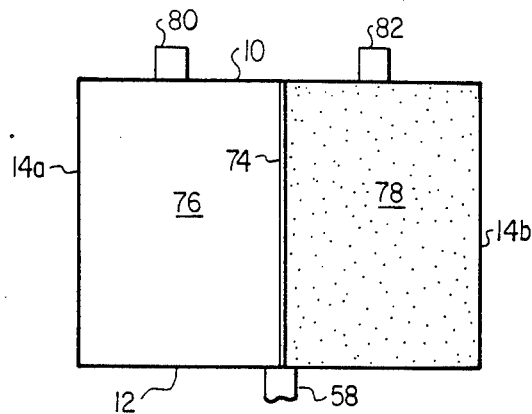

According to the embodiment of FIG. 5, a single partition 74 is provided which extends upwardly from the grate, and which divides the furnace section 4 into two chambers 76 and 78. It is understood that the partition 74 is aligned with a partition extending below the grate 20 in the air plenum 24 in a manner similar to the partitions 26a and 26b of the embodiment of FIGS. 1–3. Two feeders 80 and 82 extend through the sidewall 14a for discharging particulate fuel material onto the upper surface of the material in the chambers 76 and 78, respectively. The operation of this embodiment is the same as that of the embodiment of FIGS. 1–3 described above with the exception that when the load reaches a value (such as 25%–35% of full load) that requires the bed in the chamber 76 to be put into the operation, fuel can be introduced directly into the latter chamber via the feeder 80. Thus, it is not necessary to increase the fuel fed to the chamber 78 to an extent that fuel material spills over into the chamber 76.

Figure 6:
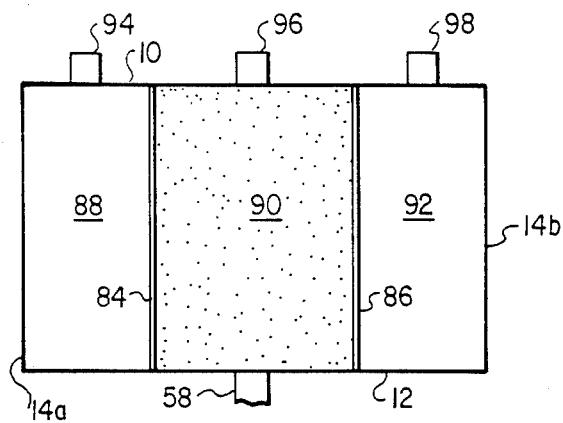

According to the embodiment of FIG. 6, partitions 84 and 86 are provided which extend upwardly from the grate, and which divide the furnace section 4 into three chambers 88, 90 and 92. It is understood that the partitions 84 and 88 are aligned with partitions extending below the grate 20 in the air plenum 24 in a manner similar to the partitions 26a and 26b of the embodiment of FIGS. 1–3. Three feeders 94, 96 and 98 are provided which extend through the sidewall 14a for discharging particulate fuel material onto the upper surface of the material in the chambers 88, 90 and 92, respectively. The operation of this embodiment is the same as that of the embodiment of FIGS. 1–3 described above with the exception that when the load reaches a value (such as 25%–35% of full load) that requires the bed in the chambers 88 and 92 to be put into the operation, fuel can be introduced directly into the latter chambers via the feeders 94 and 98, respectively. Thus, it is not necessary to increase the fuel fed to the chamber 90 to an extent that the fuel material spills over into chambers 88 and 92.

Figure 7:
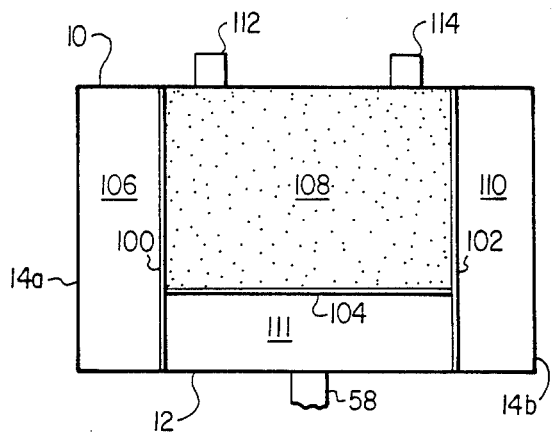

According to the embodiment of FIG. 7, partitions 100, 102 and 104 are provided which extend upwardly from the grate, and which divide the furnace section 4 into four chambers 106, 108, 110 and 111. It is understood that the partitions 100, 102 and 104 are aligned with partitions extending below the grate 20 in the air plenum 24 in a manner similar to the partitions 26a and 26b of the embodiment of FIGS. 1–3. Two feeders 112 and 114 are provided which extend through the sidewall 14a for discharging particulate fuel material onto the upper surface of the material in the chamber 108. The operation of the arrangement is otherwise the same as described above in connection with the embodiment of FIGS. 1–3.

Figure 8:
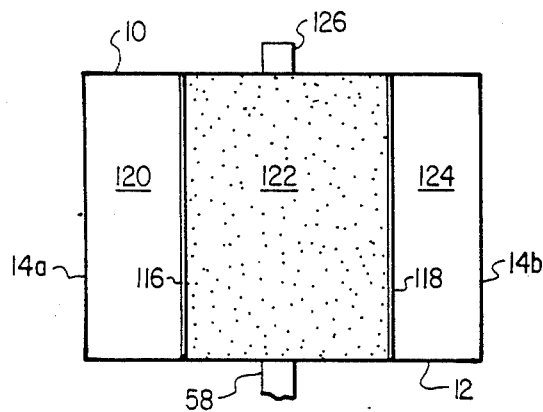

According to the embodiment of FIG. 8, partitions 116 and 118 are provided which extend upwardly from the grate, and which divide the furnace section 4 into three chambers 120, 122 and 124. It is understood that the partitions 116 and 118 are aligned with partitions extending below the grate 20 in the air plenum 24 in a manner similar to the partitions 26a and 26b of the embodiment of FIGS. 1–3. The chamber 122 has a greater width, or depth, than the chambers 120 and 124 and a feeder 126 extends through the sidewall 14a for discharging particulate fuel material onto the upper surface of the material in the chamber 122. The operation is otherwise the same as that of the embodiment of FIGS. 1-3.

Figure 9:
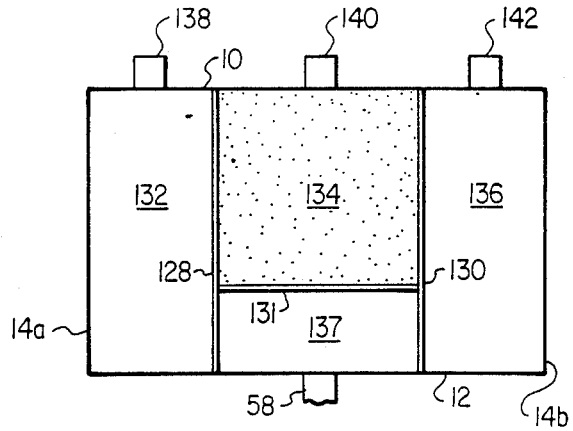

According to the embodiment of FIG. 9, partitions 128, 130 and 131 are provided which extend upwardly from the grate, and which divide the furnace section 4 into four chambers 132, 134, 136 and 137. It is understood that the partitions 128, 130 and 131 are aligned with corresponding partitions extending below the grate 20 in the air plenum 24 in a manner similar to the partitions 26a and 26b of the embodiment of FIGS. 1-3. Three feeders 138, 140 and 142 are provided which extend through the sidewall 14a for discharging particulate fuel material onto the upper surface of the material in the chambers 132, 134, and 136, respectively. The operation of this embodiment is the same as that of the embodiment of FIGS. 1-3 described above with the exception that when the load reaches a value (such as 25%-35% of full load) that requires the bed in the chamber 132 and/or 136 to be put into operation, fuel can be introduced directly into the latter chambers via the feeders 138 and 142, respectively. Fuel can be introduced into the chamber 137 by increasing the feed to any or all of the chambers 132, 134, 136 to an extent that fuel material spills over into the chamber 137 in the manner described in connection with the embodiment of FIGS. 1-3.

The embodiments of FIGS. 4-9 enjoy the above mentioned advantages of the embodiment of FIGS. 1-3 and, in addition, provide added flexibility with respect to start-up and low load operation.

Other modifications, changes, and substitutions are intended in the foregoing disclosure and in some instances some features of the invention will be employed without a corresponding use of other features. Accordingly, it is appropriate that the appended claims be construed broadly and in a manner consistent with the scope of the present invention.

What is claimed is:

1. A method of generating heat comprising the steps of:
    forming a plurality of chambers in an enclosure,
    introducing a particulate fuel material into one of said chambers,
    introducing air into said one chamber to form a fluidized bed of said particulate material in said one chamber,
    controlling the velocity of said air so that it is substantially equal to the minimum velocity required to fluidize said bed,
    introducing a particulate fuel material into another of said chambers,
    introducing air into said other chamber to form a fluidized bed of said particulate material in said other chamber,
    controlling the velocity of said air introduced to said other chamber so that it is substantially equal to the minimum velocity required to fluidized said bed in said other chamber,
    then increasing the velocity of air introduced to at least one of said chambers to a value above said minimum velocity and so that it combines with the gaseous products of combustion and entrains a portion of said particulate material,
    separating the entrained particulate material from said mixture of air and gaseous products of combustion, and
    passing said separated particulate material into one of said chambers.

2. The method of claim 1 wherein the velocity of air introduced to at least one of said chambers is increased to a value so that said mixture of air and gaseous products of combustion is substantially saturated with said entrained particulate material.

3. The method of claim 1 wherein said step of separating is done externally of said enclosure.

4. The method of claim 1 wherein said separated particulate material is injected into said other chamber.

* * * * *